T 859,005

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED FEBRUARY 4, 1969

859 O.G. 42

683,817

ADDITIVE CONTAINING TOBACCO SMOKE FILTER

John R. Hatfield, Jr., and Kyle E. Morrison, both of P.O. Box 511, Kingsport, Tenn. 37662

Filed Nov. 17, 1967. Published Feb. 4, 1969

Class 131—266

No Drawing. 14 Pages Specification

Tobacco smoke filter elements containing particles of anhydrated and/or hydrated magnesium sulfate for removing at least 50 percent of the total particulate matter contained in an effluent stream of tobacco smoke from a cigarette. A majority of the particles have a size of about 2.0 microns and the filter will selectively remove more nicotine than tar from the tobacco smoke.